J. HOFFMAN.
WATER POWER APPARATUS.
APPLICATION FILED MAY 26, 1914.

1,143,118.

Patented June 15, 1915.
5 SHEETS—SHEET 1.

UNITED STATES PATENT OFFICE.

JOSEPH HOFFMAN, OF SCHENECTADY, NEW YORK.

WATER-POWER APPARATUS.

1,143,118.   Specification of Letters Patent.   Patented June 15, 1915.

Application filed May 26, 1914. Serial No. 840,983.

*To all whom it may concern:*

Be it known that I, JOSEPH HOFFMAN, a citizen of the United States, and a resident of the city and county of Schenectady and State of New York, have invented certain new and useful Improvements in Water-Power Apparatus of the Class Known as Tide or Current Mills.

Generally stated, the invention consists in locating in the current of a river having sufficient depth, or in a tideway, a floating structure or casing, within which is located a turbine or other similar device, the upper surface of which is below the normal water level, and below the turbine inclosed within said casing is a chamber into which the water which passes through the turbine falls, and from the bottom and sides of this chamber outlets are provided, which draw off the water from the chamber so much faster than it enters at the top, that there will normally be maintained beneath the turbine an empty, or substantially empty space, so that the result or effect of the construction is that a waterfall, as it were, shall be produced and maintained in the stream or tideway because the water which falls upon and passes through the turbine has free clearance to pass away therefrom after exerting its power thereon.

Referring to the drawings, Fig. 5 illustrates a vertical sectional view similar to Figs. 2 and 3 and showing an arrangement of pipes which exhaust the water from the chamber beneath the turbine; Fig. 6 illustrates a plan view of one form of the upper plate for the turbine; Fig. 7 illustrates a sectional view taken on the curved line shown in Fig. 6 and looking in the direction of the arrow; Fig. 8 illustrates a detail showing one method of supporting the pipes which exhaust the water from the chamber below the turbine, if they be used; Fig. 9 illustrates a vertical sectional view of a modified construction of the open end of the pipes that may be used to exhaust the water from the chamber beneath the turbine; Fig. 9$^a$ illustrates a modified construction shown in vertical section of that which is shown in Fig. 9; Fig. 10 illustrates a vertical sectional view of a hollow turbine shaft through which air may be admitted to the chamber below the turbine and thus atmospheric vacuum therein may be regulated and controlled.

Figure 1:
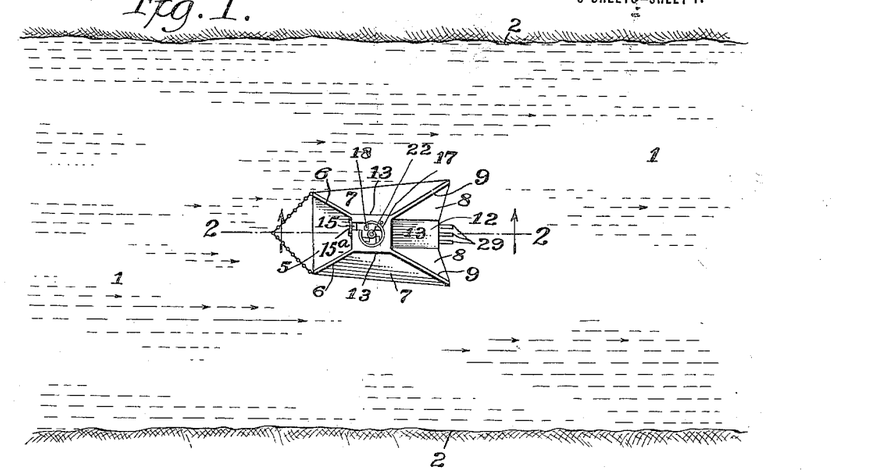
Figure 1 illustrates a plan view of the invention shown as built of masonry or similar construction and adapted to be placed upon a foundation in a shallow stream.
Figure 2:
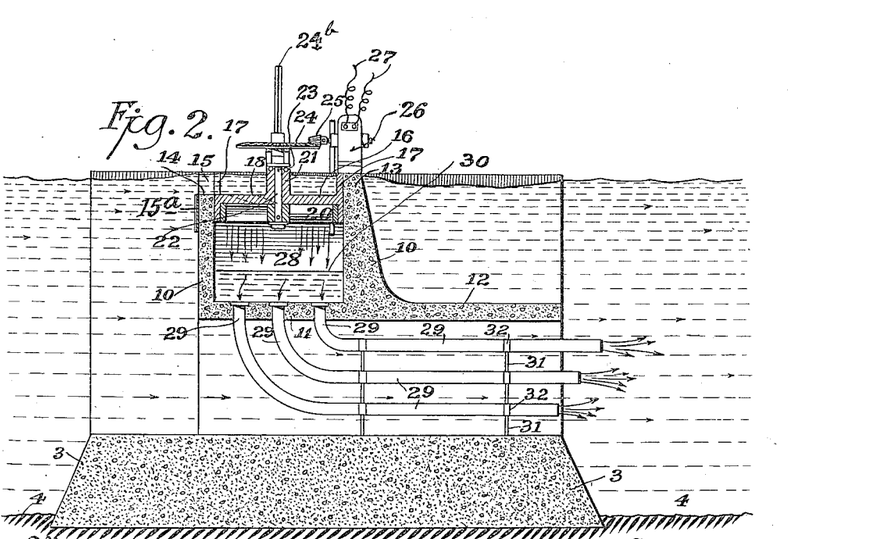
Fig. 2 illustrates a vertical section on the line 2—2 of Fig. 1, showing one form of construction.

Referring first to Figs. 1 and 2, 1, 1, represent a river through which the current flows from left to right as indicated by the arrow and in which the water level is normally substantially uniform. 2, 2, are the banks of the river.

At such place in the river as shall afford the most rapid current and suitable depth of water, the following structure is erected upon a suitable concrete or masonry base or foundation 3 built upon the bottom 4 of the river. A structure which I prefer shall present an open flaring or funnel-shaped forward end formed by two vertical wings 6, 6, extending preferably to or nearly to the bottom of the river and somewhat above the water level, thus producing a hopper-like space or sluiceway 5. On each side are two lateral sections 7, 7, which may be open laterally or built up solid and of concrete, masonry or of timber work, as preferred. In the rear there are other spaces 8, 8, formed by rearwardly extending and laterally flaring partitions 9, 9, which also extend preferably from the foundation 3 upwardly to somewhat above the surface of the water. Within the space thus formed is what I call the turbine casing. In the example shown, it is composed of a rectangular masonry or concrete structure 10 having watertight front and rear walls and side walls as shown and a watertight bottom 11. From the lower rear side of this casing there extends rearwardly a watertight extension 12 (see Fig. 2) which forms a sort of sluiceway. The two lateral sides and the rear edge 13 of the casing at the top are carried upwardly above the water level, but the front edge 14 is cut away as at 15, thus producing a gate provided with a cut-off $15^a$, through which the water will run upon and over the top plate 16 of the turbine (see Figs. 2 and 6). When desired, the flow of water can be stopped by raising the cut-off. This plate 16 has a circular flange 17 so as to guide the water and give it a swirling or circular movement, and in its bottom are a series of inclined openings 18 (see Figs. 6 and 7) down through which the water rushes and strikes the pockets 19 of the turbine located beneath it. In the center of the plate 16 is an upwardly extending hub or casting 21 which in the example shown supports a shaft 22 which may beneficially be supported upon ball bearings 23 and has at its upper end any suitable power transmitting devices for engagement with a dynamo. I show a bevel gear 24 which is supported in any suitable manner and in order that the plate 16 may be elevated or depressed as occasion requires, the gear 24 is feathered to the shaft as indicated by the groove $24^b$ in the shaft. The gear 24 engages with a pinion 25 upon the shaft of the dynamo 26, the current from which may be carried thence through conductors 27 (see Fig. 2) in a manner well known to any desired place and for any desired use.

It will be understood that the special construction of the turbine wheel, the arrangement of the plate 16 relative to it and the construction and arrangement of the devices for transmitting power may all be varied at will; also that the plate 16 and of course the underlying turbine will be elevated or lowered in the casing as may be desired. The lower it is placed the greater fall the water will have upon it and consequently the greater the power exerted by it upon the turbine; and it will be understood that it will frequently be necessary to provide this part of the apparatus with additional supporting and strengthening devices, depending upon the size and weight of the turbine wheel and the special features of the construction.

Figures 5, 6, 7, 8, 9, 9A, 10:
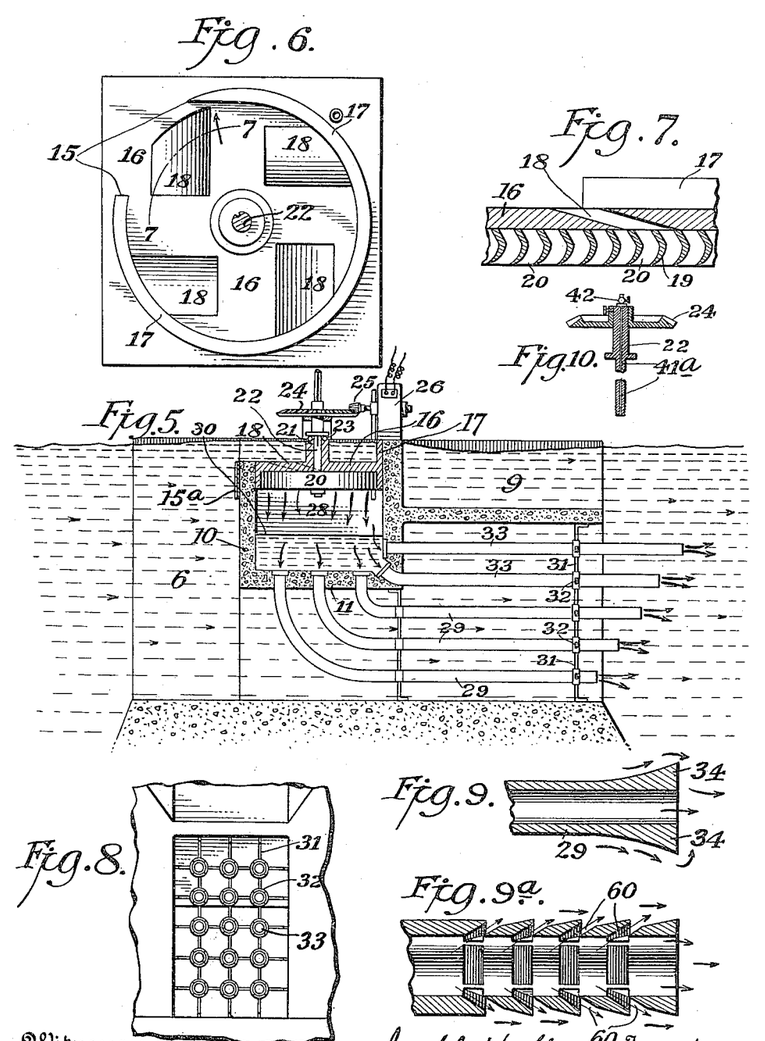

Beneath the turbine 20 and within the casing 10 is a chamber 28 which is closed at the bottom as at 11 (see Figs. 2 and 5). Set in this bottom are a series of pipes 29 which extend rearwardly, discharging as shown at the rear or downstream end of the structure. I prefer to make these pipes of different lengths so that they will not all discharge on the same vertical line, on the contrary, each row or set of them will discharge successively farther down stream than the others which are shorter. This is so that each set may exercise their greatest efficiency without being handicapped or interfered with by the discharge of another set in the same area of the flowing current.

It will be understood that the space beneath the casing 10, 11, 12, and the upper surface of the foundation 3 is open at both ends and that the current being deflected inwardly after the fashion of a funnel or hopper by the upstream flaring wings 6, 6, rushes through this open space or sluiceway surrounding the pipes 29 on all sides with accelerated movement as compared with the normal current on the outside of this apparatus, so that as the water emerges at the downstream end from this sluiceway, it exerts a sucking action upon the lower ends of the pipes 29, and consequently the water that passes through the turbine into the chamber 28 will be withdrawn from that chamber faster than it comes in because in its passage into the chamber, although it has a drop of some distance from the normal water level to the upper plate 16 of the turbine, yet it is then partially arrested in its downward movement because of the somewhat contracted inclined openings 18 in the plate and is additionally impeded by the buckets of the turbine, whereas the water in the chamber 28 is exhausted or drawn off therefrom more rapidly than it enters because of the exhaust pipes 29 and the sucking action induced at the rear ends of these pipes by reason of the rush of the current past them, so that the chamber 28 will ordinarily be partly free at least of water, affording free clearance for and hence powerful action of the water coming through the turbine upon it. It cannot be foretold exactly where the water level within this chamber 28 will be. Indeed this will vary according to circumstances. I illustrate it arbitrarily in Figs. 2 and 5 as at 30, but it will be understood that this is merely for the purpose of illustration. It may be higher or lower or the chamber may be practically empty. Also because of the differing conditions under which the apparatus may be used, it is impossible to give definite instructions relative to the number or size of the exhaust pipes 29 or their special arrangement. These are matters concerning which the advice of a competent engineer will have to be taken for the installation of each particular plant or system. It may be stated generally, however, that the size and number of the exhaust pipes 29 should be at least such that their aggregate capacity shall be equal to the capacity of the inlet openings 18, through the upper plate of the turbine. Beyond this, the extent of the vertical drop possible at the forward end of the exhaust pipes and the sucking efficiency of the current in passing by the downstream open ends of the pipes should be taken into account. Inasmuch as these exhaust pipes will sometimes be of considerable size and have considerable length, I illustrate a method in which they may be supported as by braces or spacers 31 provided with sectional collars 32 (see Fig. 8) clamped upon the pipes and to each other in any preferred manner.

Instead of so locating the exhaust pipes 29 that they shall enter at the bottom of the chamber 28 as described, they may be arranged to enter the side of the chamber 28 as shown in Fig. 5 at 33, 33. I do not limit myself in this respect. Also sometimes I prefer to bell out the open end of the exhaust pipes as shown at 34 in Fig. 9. This is so that the water flowing over them may be deflected outwardly at the very ends of the pipes, thus tending to reduce the pressure at their open ends, as shown by the arrows in Fig. 9, thus affording better clearance for the water within the pipes and hence adding to the sucking action referred to and accelerating the flow through them, and to aid in this respect the bottom of the sluiceway may beneficially be built on a downward angle as shown at 32ª in Fig. 3. The effect of this is to deflect the water and reduce its elevation at or near the open ends of the discharge pipes 29.

Instead of belling the open end of the exhaust pipes as above described and illustrated in Fig. 9, the construction shown in Fig. 9ª may be employed, that is to say, at or near the open end of the pipe a series of inclined openings may be made from the exterior to the interior of the pipe, the inclination being in the direction of the flow, that is to say, such as represented by 60 in Fig. 9ª. These openings may be merely a succession of round holes bored circumferentially through the wall of the exhaust pipe, but I prefer, in order that their capacity may be increased, to make them in the form of elongated slots, there being sufficient uncut metal left to support the otherwise severed part of the pipe. The number of these openings circumferentially of the pipe may be more or less than that shown in Fig. 9ª.

Figure 11:
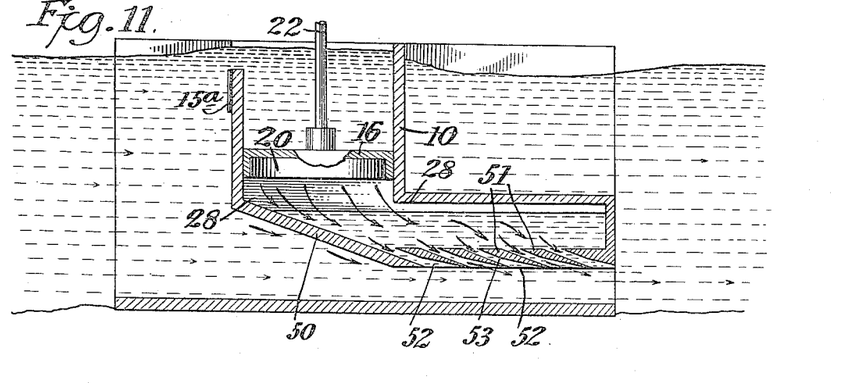
Fig. 11 illustrates a vertical sectional view of another form in which the devices for exhausting the water from the chamber beneath the turbine may be constructed.

As an alternative method of exhausting the water from the chamber 28, I may use, instead of the exhaust pipes 29, or, if desired, in conjunction with them, the construction shown in Fig. 11, in which 10 represents the casing, 16 the upper plate, 20 the turbine and 28 the chamber below the turbine. It will be noted that in this construction the chamber 28 extends downwardly into the sluiceway and that it also extends rearwardly. The bottom of this extended part of the chamber is composed of an inclined front wall 50 and a series of inclined slats or partitions 51 which produce inclined waterways 52 between them, the ends of which are expanded by cutting away upon a very obtuse bevel the lower parts 53 of the partitions 51. The effect of this construction is that the water rushing through the sluiceway and rapidly passing the lower ends of the waterways 52 will exert a sucking action thereon and withdraw the water from the chamber 28 above.

Figure 16:
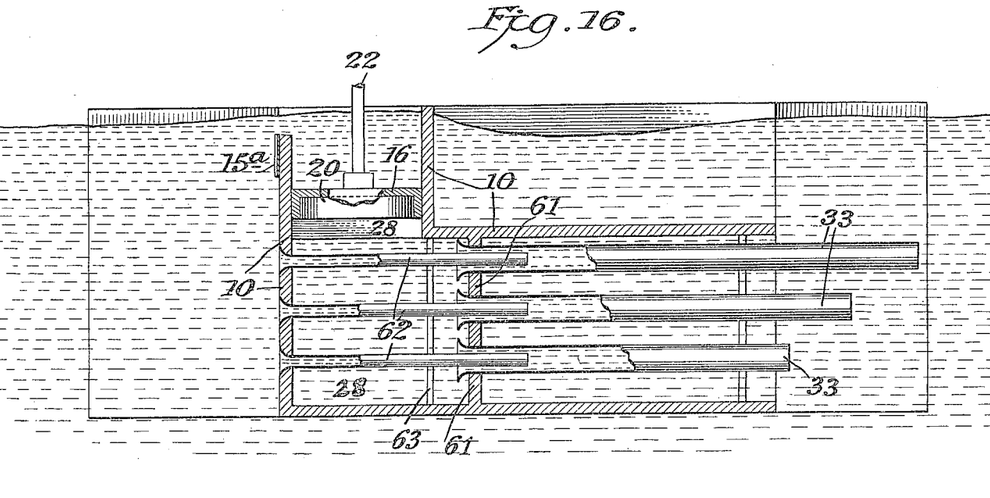
Fig. 16 illustrates a vertical sectional view of a modified construction wherein the exhaustion of the water from the chamber beneath the turbine is aided or enforced.
Figure 17:
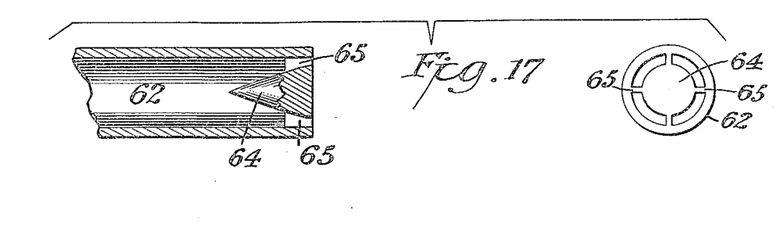
Fig. 17 illustrates a vertical sectional view of one of the injector tubes and an endwise plan view of the same.

In Figs. 16 and 17 I show still another method of constructing the parts whereby the water, after passing through the turbine and falling into the chamber 28, is delivered therefrom under what I call a compulsory system, whereby the outflow of the water is aided or compelled. In these figures 10 represents the casing, as before, 16 the vertically adjustable turbine plate, 20 the turbine, 28 the chamber beneath the turbine, 33 the exhaust pipes, the ends of which have different down-stream projections, all substantially as heretofore described. The differences between this construction and any heretofore illustrated, are as follows: The bottom of the chamber 28, instead of being arranged horizontally as in the other figures, is arranged vertically, as at 61, thus materially enlarging the area of the chamber 28, and the front wall of the chamber, in other words, the casing 10 is extended downwardly and through it a series of tubes 62 are arranged, their ends being expanded after the manner of boiler tubes, where they pass through the crown sheets of an ordinary boiler, there being one of these tubes 62 for each of the exhaust pipes 33. The forward end of each of these tubes 62 is supported by being extended through the casing 10 which, it will be noted, forms the rear wall of the hopper of the apparatus, and in order that the rear part of the tubes 62 may be suitably supported, I provide brace bars or supports 63 which may be made of such form and in such manner as preferred. They may be similar to the braces 31—32 shown in Fig. 5. Any suitable means for supporting these tubes may, however, be adopted. Each of the tubes 62, after passing through the chamber 28, enters into the forward end of one of the exhaust pipes 33. The degree of projection of the tubes 62 within the exhaust pipes 33 may beneficially be substantially that shown in the drawings, but there is no fixed distance necessary. It will depend upon the conditions presented and may vary as they vary.

The operation of this construction is as follows: The water, under the action of the flowing river or tide current, as the case may be, being caught by the expanded sides of the hopper, is increased in pressure within the hopper, particularly against its rear wall, so that it is forced through the tubes 62 under greater pressure than the normal flow of the current, so that the passage of the water through the tubes 62 is materially accelerated, somewhat after the fashion of water, steam or other fluid through an injector tube, and the discharge of this accelerated water jet, so to speak, within the exhaust pipes 33 generates a substantial suction within the exhaust pipes 33, so that the flow of water through them and consequently the exhaust of the water from the chamber 28, is materially increased, and in order that this action may be made still more pronounced, I sometimes insert in the open down-stream end of the injector tubes 62, the device illustrated in Fig. 17, which in effect is a sharply conical plug 64 which occupies the central portion only of the interior of the open end of the tubes 62 and is supported against its inner walls by a suitable number of lugs or equivalent supports 65. Three of these are shown in the drawings, but any other preferred number may be employed. The operation of this plug is to restrict the opening at the end of the injector tubes, somewhat after the fashion of a nozzle of a fire engine hose, or the nozzle or orifice of an atomizing apparatus, so that the water passing through the tubes 62 under increased pressure as compared with that of the normal current, will be still further increased in its velocity by the stated restriction of the opening, and in addition to this, will be ejected in a ring-like form which will operate more efficiently to generate suction, or to increase the current through the exhaust pipes 33 because of the tendency to form a hollow space or cavity in the water within the exhaust pipes 33 adjacent to the end of the injector tubes 62.

Should there be any tendency to produce a vacuum beneath the turbine, it may beneficially be employed and regulated by providing means to control the vacuum. This can be done by putting a vent tube 41 (see Figs. 3 and 4) connecting with the interior of the chamber 28. This same result can be attained by making the shaft of the turbine hollow, or otherwise providing it with means for the admission of air. This is shown in Fig. 10. 22 is the shaft and 24 the gear thereon, heretofore referred to, the shaft being shown as having an air passage 41ª through it, provided with a regulating cock 42 at the top.

The system as thus far described is, as stated above, more particularly adapted to use in a river or stream where it will be feasible to erect a permanent foundation in the bottom of the river, upon which the structure may rest, and under such conditions also as will afford substantially uniform water level. Obviously, however, the same principle is adapted to tideways, where the flow or movement of the tide is sufficient to effect the purpose of the system, but in this use, inasmuch as there is considerable difference in water level between high and low water, obviously means should be provided whereby the turbine and its co-acting parts are maintained in substantially a fixed relation to the surface of the water. To accomplish this, I arrange my apparatus as shown in Figs. 3 and 4, and 12 to 15 respectively, which illustrate different ways in which the apparatus may be constructed. Obviously the same results can be attained by differently constructing the parts. Those shown are examples merely.

Figure 3:
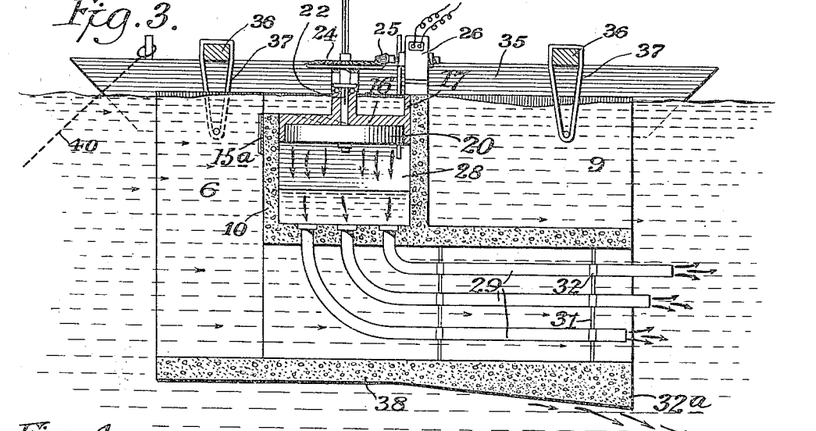
Fig. 3 illustrates a vertical sectional view, showing one construction when the invention is used in a deep river or tideway. In this case the structure is a floating one and consequently adapted to rise and fall with the tide and swing as the tide changes.
Figure 4:
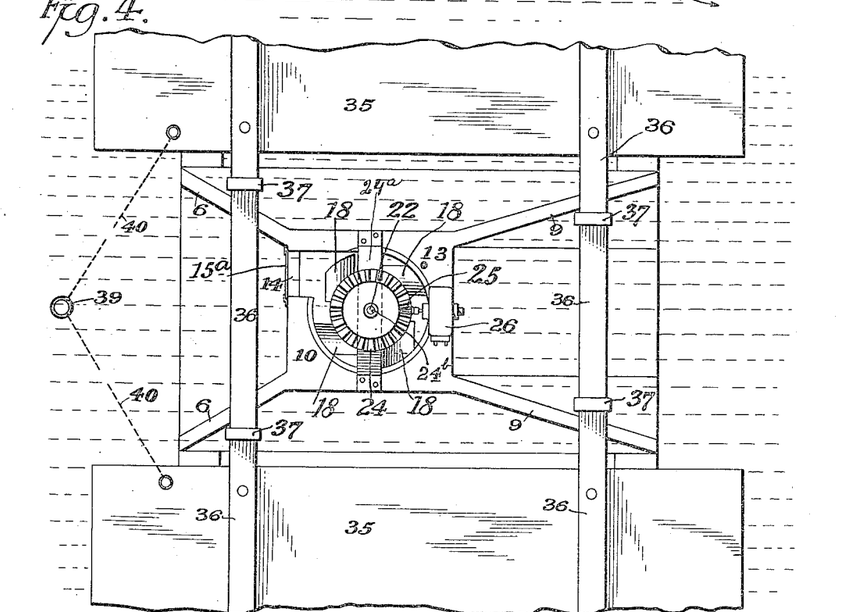
Fig. 4 illustrates a plan view of the construction shown in Fig. 3.

Referring first to Figs. 3 and 4, the main parts of the apparatus are the same as already described and it will not be necessary to specifically refer to them except to say that 35 represents two floats or scows connected together by strong trusses or crossing beams or frames which are indicated at 36, and from these supports is suspended, as by hangers 37, the casing 10, having its wings 6 and 9 and all other co-acting parts the same as heretofore described. I prefer, however, in this instance, to load the bottom of the casing with a layer of concrete 38 which shall act as ballast to steady the structure in the event of wave action. It will of course be understood that this floating structure will be suitably maintained in position, as by a spile or anchor 39, engaging with suitable stays or mooring chains 40, or equivalent devices, so that the float will swing at its moorings after the manner of an ordinary vessel at anchor, thus presenting its bow or forward end to the oncoming tide when it changes from flood to ebb and vice versa.

Figure 12:
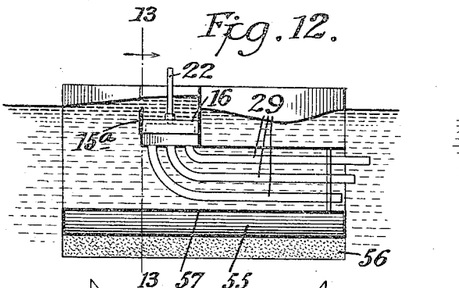
Fig. 12 illustrates a longitudinal vertical sectional view of a modified form of floating apparatus.
Figure 13:
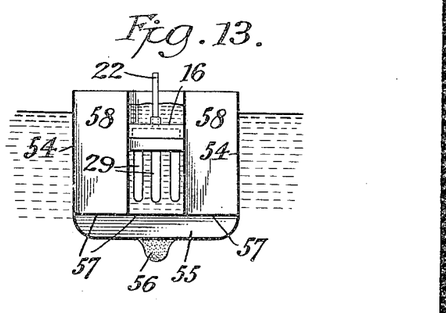
Fig. 13 illustrates a transverse vertical section of the construction shown in Fig. 12.

In Figs. 12 to 15 respectively, I show alternative methods in which the invention, if embodied in a floating structure, may be constructed, that is to say: instead of suspending the operative parts of the apparatus from a couple of floats or scows, as illustrated in Figs. 3 and 4, the parts in certain respects may be so changed in construction as to have flotation in and by themselves, that is to say, in Figs. 12 and 13 the open spaces, one at each side of the structure, shown clearly in Fig. 1, may be inclosed by walls or siding 54, 54, and beneath the sluiceway there is made a downwardly extending bottom or keel part 55, below which there may extend downwardly a keel part proper 56 which may be filled with concrete or equivalent material adapted to act as ballast for the structure. If desired, the ballast may extend upwardly into the chamber 55. I prefer to separate this underlying keel or vessel bottom part of the structure from the sluiceway and the flotation chambers by a flooring or false bottom 57, to form a flooring for the empty flotation spaces 58, 58, at each side of the structure and its central part will form a bottom for the sluiceway through which the water will run.

Figure 14:
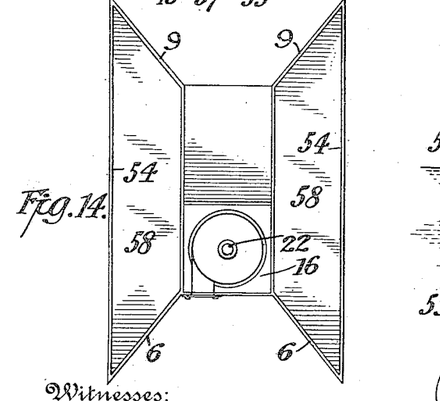
Fig. 14 illustrates a longitudinal plan view of still another form in which a floating structure can be made.
Figure 15:
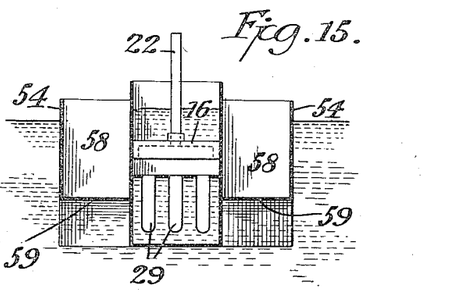
Fig. 15 illustrates a transverse vertical section of that which is shown in Fig. 14.

In Figs. 14 and 15 I show still another method of construction. In it the side walls 54 are shown the same as just above described, which produce empty flotation chambers 58 which, in the example shown, do not extend clear down to the lower edge of the sluiceway nor to the lower ends of the flaring or hopper producing walls 6, 6, at the bow of the apparatus and 9, 9, at its stern, on the contrary, are stopped off at some intermediate place, as, for instance, as shown at 59, in Fig. 15. These stoppages 59 which in effect form the bottom of the flotation chambers will depend upon the size and weight of the structure and the degree of flotation necessary and it will be noted that since they do not extend down to the lower edge of the flaring walls 9, 9, at the rear or stern of the vessel, that provision is made for the water to be deflected laterally thus reducing the water pressures at the rear, correspondingly aiding in the sucking action from the chamber 28.

I call attention to the following advantageous features which are incidents of the invention: If the apparatus be made as a floating structure, then should occasion require, it may be floated into a dry dock for repair. Also the apparatus may be made of metal embodying ship construction from which a series of advantages will result. Also that the effect of the hopper at the bow or upstream end of the structure will be to elevate the water level adjacent to the runway to the turbine and also the effect of the hopper like construction at the downstream or stern end of the apparatus will be correspondingly to reduce the level of the water in the rear, thus increasing the efficiency of the turbine and also tending to increase the rapidity of the flow of the water through the underlying sluiceway.

I do not show any bridge or deck or other devices whereby access can be had to the turbine in the event that it shall require repair, nor any guard gate to keep floating matter away from the turbine, nor provision for the utilization of water ballast nor in fact any of the accessories of such structures, for they are now well known and do not require illustration or description.

I wish it distinctly understood that the construction of the parts and their arrangement in the embodiments of the invention illustrated by me are given as examples merely of different forms in which the invention may be constructed and embodied. They may be materially departed from and still the essentials of the invention be used and particularly that the method of supporting the operative parts is immaterial. A fixed foundation adapted to shallow rivers or waterways or means for giving flotation to the structure as illustrated and described above may be employed and other ways also, as for example, spiles driven in the bottom of a water way, suspending cables after the manner of a suspension bridge, or any equivalent construction may be employed.

I claim:

1. A water power apparatus embodying a closed casing located in a current or tideway, a perforated plate within the casing below the water level, a turbine below the plate adapted to receive upon its buckets the water that passes through the perforations in the plate, a closed chamber below the turbine, and means adapted to conduct the water away from the chamber located within an inclosed sluiceway below the chamber.

2. A water power apparatus embodying a closed casing located in a current or tideway, a perforated plate within the casing below the water level, a turbine below the plate adapted to receive upon its buckets the water which passes through the perforations in the plate, a closed chamber below the turbine and open ended devices adapted to conduct the water away from the chamber, the open ends thereof having different rearward projection.

3. A water power apparatus embodying a closed casing located in a current or tideway, a perforated plate below the water level having an open sided annular flange or curved surface adapted to direct the water in a circular manner at the upper end of the casing, a turbine below the plate adapted to receive upon its buckets the water that passes through the perforations in the plate, a closed chamber below the turbine and means adapted to conduct the water away from the chamber.

4. A water power apparatus embodying a closed casing located in a current or tideway, a plate within the casing below the water level having an open sided annular flange or curved surface and inclined perforations, a turbine below the plate adapted to receive upon its buckets the water that passes through said inclined perforations, a closed chamber below the turbine and means adapted to conduct the water away from the chamber.

5. A water power apparatus embodying a closed casing located in a current or tideway, a perforated plate within the casing below the water level, a turbine below the plate adapted to receive upon its buckets the water that passes through the perforations in the plate, a closed chamber below the turbine, means adapted to conduct the water away from the chamber located in a contracted sluiceway and water deflecting wings adapted to direct the current through the sluiceway.

6. In a water power apparatus adapted to use in a current or tideway, a closed casing, a turbine within the casing below the water level, a chamber below the turbine and means for exhausting the water from said chamber located in an inclosed sluiceway.

7. In a water power apparatus adapted to use in a current or tideway, a closed casing, a turbine within the casing below the water level, a chamber below the turbine, means for exhausting the water from said chamber located in an inclosed sluiceway and means adapted to intercept the current and deflect it toward the turbine and increase its flow through the sluiceway.

8. In a water power apparatus adapted to use in a current or tideway, a closed casing, a turbine within the casing below the water level, a chamber below the turbine, a sluiceway beneath the turbine, means located in said sluiceway for exhausting the water from said chamber, means adapted to intercept and gather the current and deflect it inwardly toward the turbine, thus lifting the water level, and other means at the opposite end of the apparatus adapted to disperse and lower the water level.

9. In a water power apparatus adapted to use in a current or tideway, a closed casing, a turbine within the casing below the water level, a chamber below the turbine, means to exhaust the water from the chamber and means to give flotation to the structure.

10. In a water power apparatus adapted to use in a current or tideway, a closed casing, a turbine within the casing below the water level, a chamber below the turbine, an inclosed sluiceway below the turbine, means located in the sluiceway adapted to exhaust the water from the chamber and means to give flotation to the structure.

11. In a water power apparatus adapted to use in a current or tideway, a closed casing, a turbine within the casing below the water level, a chamber below the turbine, an inclosed sluiceway below the turbine, means located in the sluiceway adapted to exhaust the water from the chamber, means to give flotation to the structure and means for so holding the structure that it may swing with the tide or current.

12. In a water power apparatus adapted to use in a current or tideway, a closed casing, a turbine within the casing below the water level, a chamber below the turbine, exhaust pipes leading away from the chamber, and tubes passing through the front wall of the chamber, thence through the chamber itself and entering the forward end of the exhaust pipes.

13. In a water power apparatus adapted to use in a current or tideway, a closed casing, a hopper opening up-stream at the front side of the casing, a turbine within the casing below the water level, a closed chamber below the turbine, exhaust pipes connecting with the chamber and extending rearwardly, and tubes passing through the front wall of the chamber and opening into the rear of the hopper, then passing through the chamber and entering the forward end of the exhaust pipes.

14. In a water power apparatus adapted to use in a current or tideway, a closed casing, a turbine within the casing below the water level, a chamber below the turbine, exhaust pipes leading away from the chamber provided with means at their downstream end for increasing the clearance or delivery of water therefrom, and tubes passing through the front wall of the chamber, thence through the chamber itself and entering the forward end of the exhaust pipes.

In testimony whereof I have signed my name to this specification in the presence of two subscribing witnesses.

JOSEPH HOFFMAN.

Witnesses:
ALBERTINA R. MELCHINGER,
ROY W. PETERS.

Copies of this patent may be obtained for five cents each, by addressing the "Commissioner of Patents, Washington, D. C."